Patented Nov. 13, 1923.

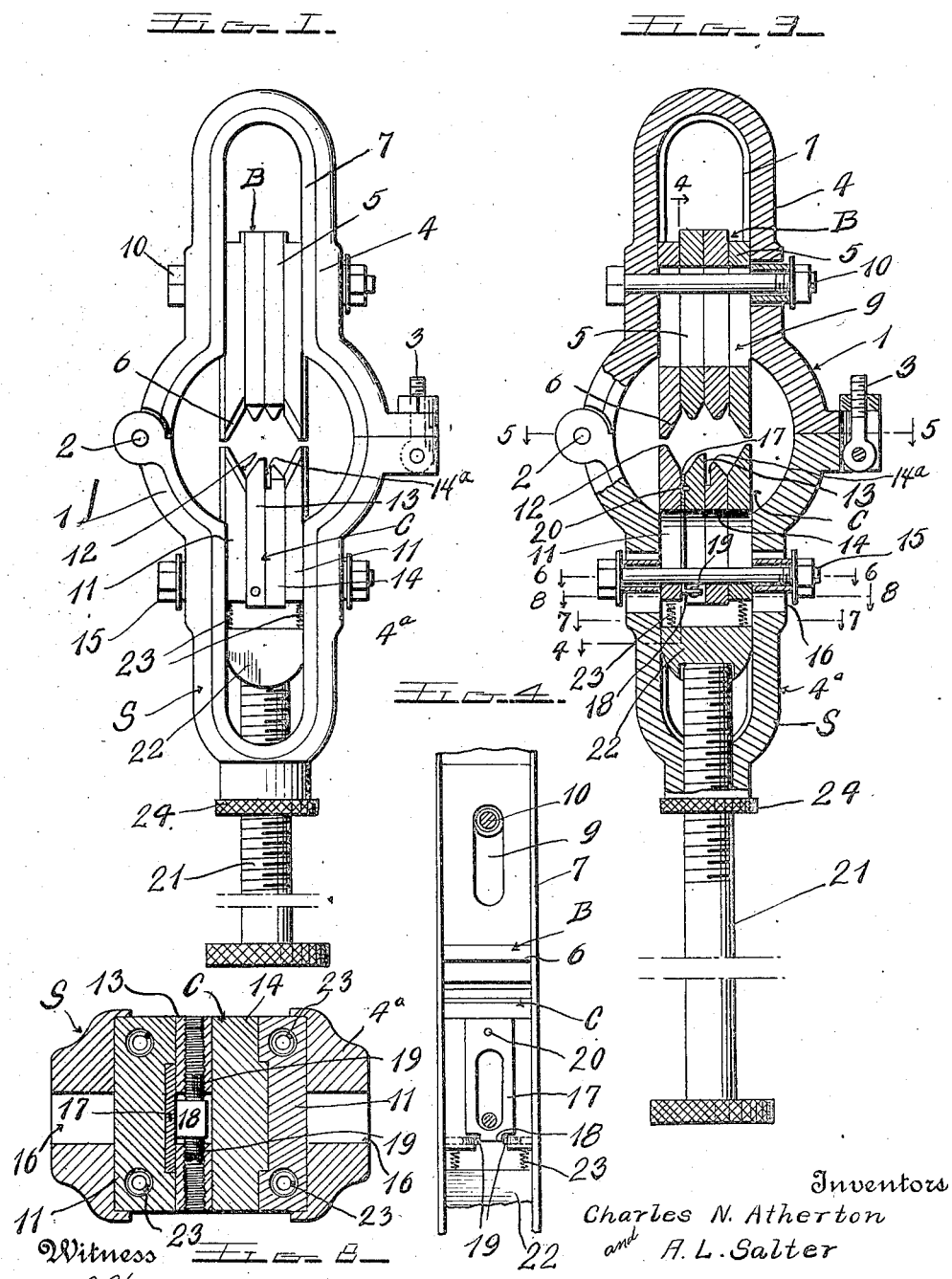

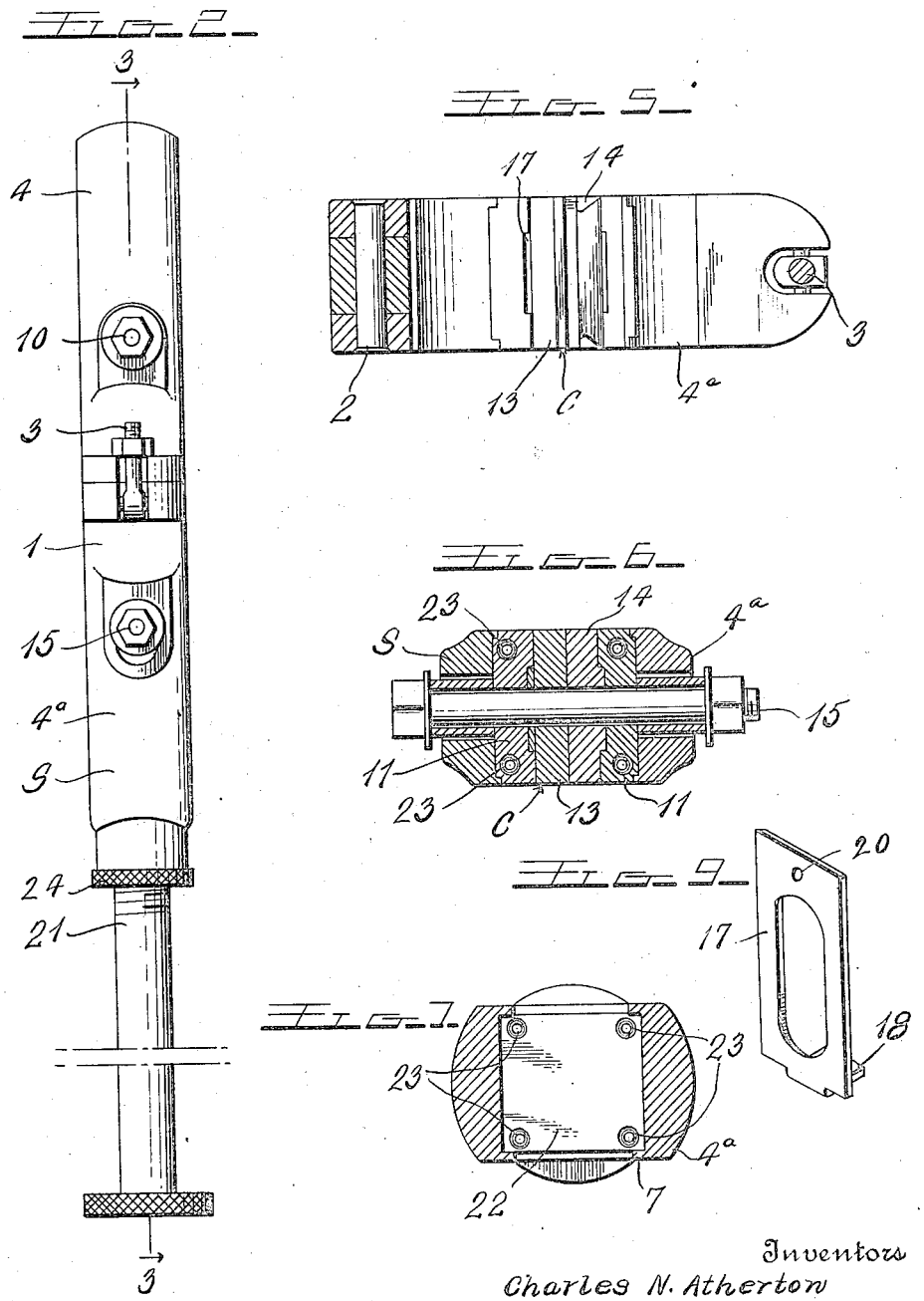

1,473,804

UNITED STATES PATENT OFFICE.

CHARLES N. ATHERTON AND ALBERT L. SALTER, OF WICHITA, KANSAS.

CRANK PIN AND SHAFT TRUING TOOL.

Application filed November 18, 1920. Serial No. 424,983.

*To all whom it may concern:*

Be it known that we, CHARLES N. ATHERTON and ALBERT L. SALTER, citizens of the United States, residing at Wichita, in the county of Sedgwick and State of Kansas, have invented certain new and useful Improvements in Crank Pin and Shaft Truing Tools; and we do declare the following to be a full, clear, and exact description of the invention, such as will enable others skilled in the art to which it appertains to make and use the same.

This invention relates broadly to improvements in hand lathes or tools, and it has more particular reference to a device of this class which is especially designed for truing crank shafts and crank pins.

One object of the invention is to generally improve upon, simplify, reduce the number of parts and cost of manufacture of our Patent No. 1,344,831, granted to us on June 29, 1920.

Another object of the invention is to provide a device of this class which is provided with novel cutting means, which is such that the cutter or blade may be removed for sharpening and replaced whenever necessary or desired without removing the clamping bolt or other parts with which it is associated.

A further object of the invention is to provide a device of the class specified having novel work engaging means for accurately guiding the tool around the work, this means including a plurality of longitudinally adjustable plates provided with novel coacting means for preventing relative lateral movement of said plates.

A still further object of the invention is to provide a tool of the above mentioned class which includes novel cutting means made up of a plurality of longitudinally adjustable members which are provided with similar means for preventing relative lateral movement thereof, this means including a novel device for permitting the cutter to be removed.

Another object of the invention is to provide a tool equipped with the novel work engaging and guiding means and novel cutting means above referred to, the latter including work engaging and guiding means which is spring pressed for automatically forcing it into engagement with the work.

A further object of the invention is to provide a tool equipped with said novel cutting means, one of the members of which is so constructed that a pocket is provided between it and the adjacent member for collecting some of the cuttings.

Other objects and advantages of the invention will be apparent during the course of the following description.

In the accompanying drawings, forming a part of this specification and in which like numerals are employed to designate like parts throughout the same:

Figure 1 is a front elevational view of a hand lathe or tool constructed in accordance with our invention.

Fig. 2 is an end elevation thereof.

Figure 3 is a sectional view, with parts in elevation, taken on the line 3—3 of Fig. 2, looking in the direction of the arrows.

Fig. 4 is an enlarged section taken on the line 4—4 of Fig. 3.

Figs. 5, 6, 7 and 8 are horizontal sections taken on the lines 5—5, 6—6, 7—7 and 8—8 of Fig. 3.

Fig. 9 is a detail perspective view of one of the elements of the cutting means of the device.

Briefly described, the device consists of a stock S, cutting means C, means for accurately guiding the stock and cutting means around the work, comprising a bearing B, and other novel features of construction to be hereinafter specifically described.

The stock S above referred to is preferably in the form of an elongated frame provided with a central yoke 1 formed of two sections hinged together at 2 and secured together at their meeting ends by means of a pivoted bolt or other suitable means 3. This frame also includes, extending from the sections of the yoke, two U-shaped guides 4 and 4ª which carry the work engaging and guiding means B, and cutting means C respectively.

The bearing B in the present case is similar to the one disclosed in the above referred to patent except that it is made up of a lesser number of plates. These plates are longitudinally adjustable with respect to each other but contrary to our patent are not transversely adjustable. Specifically described, the cutter B comprises four plates 5, two of which are short and the outer two of which are a little longer than the others to enable them to project beyond the ends of the latter, this projecting portion being beveled as indicated at 6 to effectively engage the work, steady the tool and obviate the necessity of the employment of bolts, such as disclosed in our patent. As before stated, these plates are prevented against relative lateral movement, the means employed for accomplishing this feature being preferably in the form of keys and keyways. In the showing of the device, some of the keys are integral with the two center plates and the outer plates are provided with longitudinal grooves in their inner faces for receiving these keys and permitting relative adjustment of the plates; these outer plates being also provided with keys for disposition between flanges 7 of the stock. Plates 5 are provided with slots 9 which permit passage therethrough of the clamping bolt 10, said bolt extending through the sides of the guide members 4 and serving to rigidly clamp the bearing in place. The openings 9 are sufficiently large to permit the plates to be relatively adjusted in order to bring their working faces into snug engagement with the work.

The cutter or cutting means C is constructed very much like the bearing, that is, it is made up of a plurality of relatively adjustable plates which are provided with keys and key-ways to prevent relative lateral shifting of the plates and to retain the outer plates between the guide flanges 7 of the member 4ª. The outermost plates in this instance 11 are likewise longer than the center ones and they also have their inner ends beveled as indicated at 12 for effectively engaging the opposite sides of the work to steady the tool. One of the plates, 13, is provided with a cutting edge and the plate 14 adjacent to this one is a little shorter and serves as a means for limiting the depth of the cut to be made. At this point it is to be mentioned that the last named plate 14 is provided at its inner end and in its face adjacent the plate 13 with a notch or recess which forms, between itself and the cutter plate 13, a pocket 14ª for catching the cuttings. The plates are provided with slots for passage of the clamping bolt 15 which extends through the member 4ª and serves to clamp the parts of the cutter in various adjusted positions, adjustment of this bolt being permitted by means of the elongated slots 16 formed at points opposite each other in the member 4ª. It is to be noted that the slot in the cutter plate or blade 13 opens entirely through its lower edge thereof so as to permit this plate to be removed for sharpening and readily replaced as before intimated. In order that this blade may be moved laterally for angling its cutting edge with respect to the axis of the work for truing tapered work, and to permit it to be removed for sharpening, we provide novel means. This means is in the form of a detachable key or rib which is made from a relatively thin plate 17 interposed between the cutter plate 13 and the adjacent work engaging plate 12, the latter of course being provided with a longitudinal recess for reception of this key. The key is slotted to permit the clamping bolt 15 to pass therethrough, and it has one of its ends bent laterally as indicated at 18 for disposition in the slot in the cutter plate 13 and between the inner ends of the set screws 19 which extend through the cutter plate or blade at points opposite to one another. The latter is provided adjacent its cutting edge with a socket for reception of a stud 20 carried by this plate 17, this serving in one way to insure that the laterally inturned end 18 is in proper position in the slot in the cutter plate, so that when the set screws 19 are rotated, they will be sure to engage this lateral end 18 and effectively connect the plate to the cutter plate. Furthermore, this stud and socket construction provides a pivotal connection between the cutter plate 13 and key 17, whereby the former may be swung on this pivot to angle its cutting edge with respect to the work for the purpose already set forth. At this point it may be well to describe the manner in which the cutter plate 13 is removed. Assuming that the parts are in the position disclosed in Figs. 3 and 4, it is first necessary to loosen the set screws 19, thus making it possible to slide the cutter plate or blade 13 outwardly beyond the working edges of the adjacent plates when the clamping bolt 15 is loosened. By so moving the cutter plate, it is possible to place a suitable instrument beneath the detachable key plate 17 and remove the stud 20 from its socket. Then, the cutter plate may be removed and the detachable key plate will remain in its groove in the adjacent work engaging plate 12. The operation is just the reverse in replacing the cutting plate, therefore, it is not necessary to describe it. Emphasis is to be laid on this particular construction, since it provides an effective means for preventing relative lateral shifting of the cutter plate with respect to the adjacent work engaging plates and it at the same time permits ready removal of the cutter plate for the purpose of sharpening it. While on this construction, we will also set forth the manner of adjusting the cutter blade to enable tapered shafts to be trued. To this end, it is only necessary to loosen one of the set-screws 19 and then tighten the remaining screw. In so doing, the plate 13 is moved on the aforesaid pivot in a lateral direction and its cutting edge naturally becomes inclined with respect to the edges of the adjacent plates. When the cutter is so positioned, tapered work may be effectively trued, as is obvious.

Means somewhat similar to that disclosed in our patent is employed in the present case for feeding the cutting mechanism toward the work, this means being preferably a hand screw 21 which extends through the threaded neck of the member 4ª and has its inner end engaged with a slidable shoe 22 arranged between the guide flanges 7 of the member 4ª. It is obvious that by rotating the screw 21 the shoe 22 will be caused to abut the slidable members of the cutting means and advance them toward the work. It is desirable to have the outermost plates 12 automatically move into engagement with the shaft. To this end, we employ a plurality of coil springs 23 which are interposed between the shoe 22 and plates 12, being receivable in sockets formed in these parts. A lock-nut 24, if desired, may be employed to prevent further rotation of the hand screw 21 after the tool has once been set.

In operation, the hinged sections of the stock are swung open and the shaft to be worked on is clamped between the bearing B and the cutting means C, after which the sections are closed and retained in such position by means of the bolt 3. By loosening the clamping bolt 10, the respective plates of the bearing B may be properly adjusted to effectively engage one side of the work. After the bearing has been properly adjusted, the cutting means C is adjusted by loosening its clamping bolt 15. As soon as this clamping bolt is loosened, the coiled spring 23 will automatically force the work engaging plates 11 into effective engagement with the work. Also, while the bolt is still loose the cutter or blade 13 is properly brought into engagement with the shaft and the plate 14 is adjusted so as to limit the depth of the cut to be made. The clamping bolt 15 is then tightened and the shoe 22 brought against the ineffective ends of the plate 14 and blade to hold these parts in engagement with the work. By grasping the handle 21 and turning the stock S around the work, the cutting means operates thereon to produce the desired truing, said cutter being advanced by the screw 21, and the depth of the cut being regulated by the plate 14.

It is obvious from the foregoing description that we have decidedly improved our patented device and have made decided improvements on all other similar prior art devices, especially in view of the fact that with our tool it is possible to lock the movable parts of the cutting mechanism against relative transverse movement and at the same time to permit the cutter to be easily and readily removed for sharpening it. Also, the number of parts employed in the present device is reduced, consequently the cost of manufacture is likewise reduced.

Furthermore, the provision of a pocket for collecting the metal cuttings is also an advantageous constructional feature to be considered. Then again, our novel construction and arrangement permits us to effectively true tapered shafts as well as straight shafts. These and other constructional features and advantages have, no doubt, become apparent from the foregoing description.

A careful consideration of the foregoing description, taken in connection with the accompanying drawings will enable persons skilled in the art to which this invention appertains to obtain a clear and thorough understanding of the same, therefore, further description is deemed unnecessary.

Effective and advantageous results can, no doubt, be assured with the construction employed, however, we do not desire to limit ourselves to this particular construction and we wish it to be understood that various minor changes in the shape, size, and arrangement of parts may be resorted to without departing from the spirit of the invention or the scope of the subjoined claims.

We claim:

1. In a hand lathe, a stock provided with a cutter, a bearing for accurately guiding said stock around the work, said bearing being made up of a plurality of relatively slidable plates, and co-acting means between the plates to prevent relative lateral movement thereof.

2. The structure set forth in claim 1, said co-acting means being keys fitting into and slidable in grooves.

3. In a hand lathe, a stock having cutting means, and a unitary bearing for engaging and accurately guiding the stock and cutting means around the work, comprising a plurality of flat plates relatively adjustable on a parallel line, the outermost plates being of a length greater than the others and having their work engaging faces beveled so as to extend beyond the ends of the other plates and on opposite sides of the work to center and steady the tool.

4. In a hand lathe, a stock provided with means for guiding it around the work, a cutter carried by the stock, being made up of relatively slidable members, and co-acting means between the latter for preventing relative lateral movement of the same.

5. The structure set forth in claim 4, said co-acting means being keys and keyways.

6. In a hand lathe, a stock provided with means for guiding it around the work, and cutting means carried by the stock including a plurality of relatively slidable plates, the two outer ones being of a length greater than the others and having their work engaging faces beveled so as to extend beyond the ends of the other plates and on opposite sides of the work to center and steady the tool.

7. In a hand lathe, a stock provided with means for guiding it around the work, a cutter carried by the stock, including a plurality of slotted flat plates resting slidably against one another to permit adjustment, a clamping bolt passing through the stock and slots in said plates to retain the latter in adjusted positions, means to adjust the cutter as a unit, and coiled springs between the latter and said means to automatically force the outermost plates into engagement with the work when the clamping bolt is loosened.

8. In a hand lathe, a stock provided with means for guiding it around the work, a cutter carried by the stock including a plurality of slotted flat plates resting slidably against one another to permit adjustment, a clamping bolt passing through the stock and slots in said plates to retain the latter in adjusted positions, a shoe slidable on said stock to abut the ineffective ends of said plates, a hand screw for actuating the shoe, and a plurality of coiled springs between the outermost plates and the shoe to automatically force the plates into engagement with the work when the clamping bolt is loosened.

9. In a hand lathe, a stock including work engaging and guiding means, and cutting means carried by the stock comprising a plurality of relatively slidable plates, at least one of which is provided with a cutting edge, and co-acting means between this plate and one of the adjacent plates to permit it to be removed for sharpening without removing the other plates.

10. The structure set forth in claim 9, said co-acting means being a detachable key on the plate with the cutting edge and a groove in the adjacent plate in which said key is receivable and slidable.

11. In a hand lathe, a stock provided with means for guiding it around the work, a slidable cutter carried by the stock, said cutter including a plurality of flat plates resting slidably against one another to permit relative adjustment, at least one of said plates being provided with a cutting edge and the slot opening through its opposite edge, the outermost plates serving as work engaging and guide plates, and one of them adjacent having a longitudinal groove in its inner face, a clamping bolt passing through said stock and plates, and a detachable key carried by the plate with cutting edges, being receivable and slidable in said groove, thus preventing relative lateral movement thereof with respect to the grooved plate and permitting it to be removed for sharpening without removing the clamping bolt or the other plates.

12. In a hand lathe, a stock equipped with means for engaging and accurately guiding the same around the work, cutting means carried by the stock comprising a plurality of flat plates resting slidably against one another to permit relative longitudinal adjustment, the two outermost plates constituting guides and work engaging means, one of the other ones constituting a cutter and the other adjacent plate forming means for limiting the depth of the cut.

13. In a hand lathe, a stock provided with means for guiding it around the work, a slidable cutter carried by the stock, said cutter including a plurality of flat plates resting slidably against one another to permit relative adjustment, at least one of said plates being provided with a cutting edge and a slot opening through its opposite edges, the adjacent plate having a longitudinal groove formed therein, a flat and relatively thin slotted plate arranged between the two last named plates, being receivable in said groove and being detachably connected to and carried by the plate with the cutting edge, thus permitting the latter to be removed independent of the other plates, and means for clamping all of the plates together and retaining them in various adjusted positions.

14. In a hand lathe, a stock provided with means for guiding it around the work, a slidable cutter carried by the stock, said cutter including a plurality of flat plates resting slidably against one another to permit relative adjustment, at least one of said plates being provided with a cutting edge and a slot opening through its opposite edge, the outermost plates serving as work engaging and guide plates, and one of them adjacent having a longitudinal groove in its inner face, a clamping bolt passing through said stock and plates, set screws extending through the opposed longitudinal edges of the plate with the cutting edge into the slot therein, a flat relatively thin slotted plate arranged between the last named plate and the grooved guide plate, being received in said groove and having a laterally extending end disposed in said slot between the inner ends of the set-screws, and co-acting means between the other end of the cutter plate and thin plate for detachably connecting the latter to the former.

15. In a hand lathe, a stock equipped with means for engaging the work and accurately guiding it around the same, and a cutter carried by the stock including flat plates slidably contacting one another, one of said plates having a recess formed in its working face, thus forming between it and the adjacent plate, a pocket for collecting the cuttings.

16. In a hand lathe, a stock equipped with means for engaging the work and accurately guiding it around the same, cutting means carried by the stock, including a plurality of flat relatively slidable slotted plates, at least one of which is provided with a cutting edge, the slot in this one opening through its opposite edge, and a clamping bolt extending through the stock and slots in said plates to retain the latter in various adjusted positions.

17. In a hand lathe, a stock including a work engaging and guiding means, cutting means including a slidable plate provided with a cutting edge, and means for angling said cutting edge with respect to the axis of the work for truing tapered shafts.

18. In a hand lathe, a stock including work engaging and guiding means, cutting means including a plurality of flat plates resting slidably against one another, one of said plates being provided with a cutting edge, one of the adjacent plates having a longitudinal recess in its inner face, a relatively thin plate constituting a key, having pivotal connection at one end with the plate which is provided with the cutting edge and being slidable in said recess, and means carried by the last named plate and coacting with said key to move this plate on its pivot, whereby its cutting may be angled with respect to the edges of the other plates for truing tapered shafts.

19. The structure set forth in claim 18, said means being set-screws carried by the plate and engageable with said key.

20. A tool of the class described including a bearing for engaging and guiding the tool around the work comprising a plurality of flat plates relatively adjustable on a parallel line, the outermost plates being of a length greater than the others and having their working faces beveled and extending beyond the ends of the other plates, whereby they will be disposed on opposite sides of the work to center and steady the tool when the latter is in operation.

21. A tool of the class described including a cutter made up of relatively slidable members, and co-acting means between the latter for preventing relative lateral movement thereof.

22. A tool of the class described including cutting means made up of a plurality of relatively slidable plates, the outer ones of which are of a length greater than the central ones, said outer plates having their work-engaging faces beveled and designed for disposition on opposite sides of the work for centering and steadying the tool when it is rotated about the work.

23. A tool of the class described including cutting means composed of a plurality of relatively slidable plates, means to adjust the cutting means as a unit, and springs between said cutter and last named means to automatically force the outermost plates of the cutter into engagement with the work.

24. A tool of the class described including a cutter composed of a plurality of slidable members, a shoe slidably mounted and designed to abut the inner ineffective ends of said members, a hand-screw for actuating the shoe, and a plurality of coil springs between the outermost plates and the shoe to automatically force the plates into engagement with the work.

25. In a tool for truing crank pins and shafts, cutting means including spaced guides to extend on opposite sides of the work to center and steady the tool, a centrally arranged cutting blade, and means associated therewith for limiting the depth of the cut, said last named means being longitudinally movable with respect to said blade.

26. The structure set forth in claim 25, the limiting means of said cutter being designed to provide a pocket for collecting the shavings.

27. A tool of the class described including cutting means having a blade with a slot formed therein and openings through its ineffective edge, set-screws extending through the opposed longitudinal edges of said blade and into said slot, a detachable key associated with said blade and having its end directed laterally and extending into said slots, said set-screws being engageable with said laterally directed end, as and for the purpose described.

In testimony whereof we have hereunto set our hands.

CHARLES N. ATHERTON.
ALBERT L. SALTER.